Dec. 23, 1958  A. E. R. ARNOT  2,865,648
TRUCKS FOR TRANSPORTING GOODS
Filed Oct. 20, 1953  3 Sheets-Sheet 2

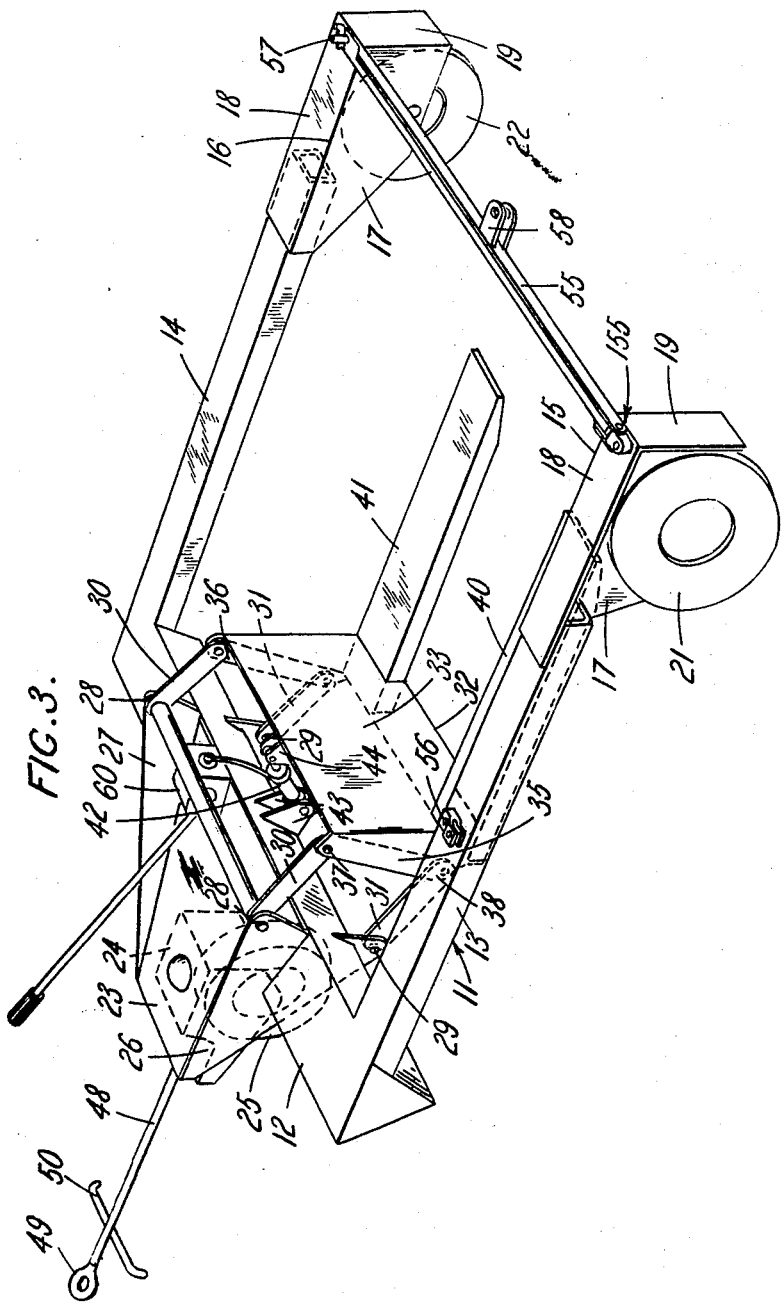

United States Patent Office 2,865,648
Patented Dec. 23, 1958

2,865,648
TRUCKS FOR TRANSPORTING GOODS

Alfred Erwin Reginald Arnot, Basingstoke, England, assignor to John Reginald Sharp and Emmanuel Kaye, Basingstoke, England Application October 20, 1953, Serial No. 387,117

Claims priority, application Great Britain October 21, 1952

3 Claims. (Cl. 280—62)

This invention comprises improvements in or relating to trucks for transporting goods.

Fork trucks are well-known for lifting and stacking goods which have been mounted on pallets or stillages. A fork truck comprises a wheeled chassis with a frame at one end which supports a fork projecting forwardly in front of the frame and adapted to enter beneath a pallet or stillage. The fork can be lifted by the frame and the goods raised to a considerable height for stacking purposes. Such trucks, while well adapted for this purpose, are not suitable for transporting goods from one end of a works to another, or along a road, because of their comparatively high cost and the limitation on the number of loads which such a truck can carry at one time.

For this reason it is a common practice to use a fork truck to pick up goods and load them on to a wheeled trolley or lorry, which may be part of a coupled train, and then at destination to use a second fork truck to unload them.

It is an object of the present invention to provide a trailer truck capable of use for transporting goods which is also able to pick them up from the ground on pallets and stillages. Such a truck can load itself and so free the fork trucks for their proper duty, i. e. stacking.

According to the present invention, a pallet or stillage transporting truck comprises in combination a chassis having a head-end and two sides extending therefrom which are spaced apart from one another, and wheels on the chassis to enable it to run along a road or floor, a load-carrying unit such as a fork or platform, crane, or clamp between the side members to load such as a pallet, stillage or other load and means on the chassis for raising the load-carrying portion of said unit, with the load thereon.

If the means for lifting the load-carrying unit comprises a linkwork connecting it to the head end of the chassis and a jack for operating the linkwork, the whole truck may be very simple, light and economical to manufacture and use.

Conveniently, the head-end of the chassis comprises a wheeled turntable and a tow-bar for the truck is attached to the turntable.

A removable tie-bar may be provided to unite the ends of the chassis when the load is in place, which tie-bar carries attachment means for the tow-bar of another truck. In this case a train of such trucks can be fitted together.

The following is a description, by way of example, of one construction in accordance with the invention:

In the accompanying drawings:

Figure 3 is a perspective view looked at from the side and top of the truck.

Figure 1:
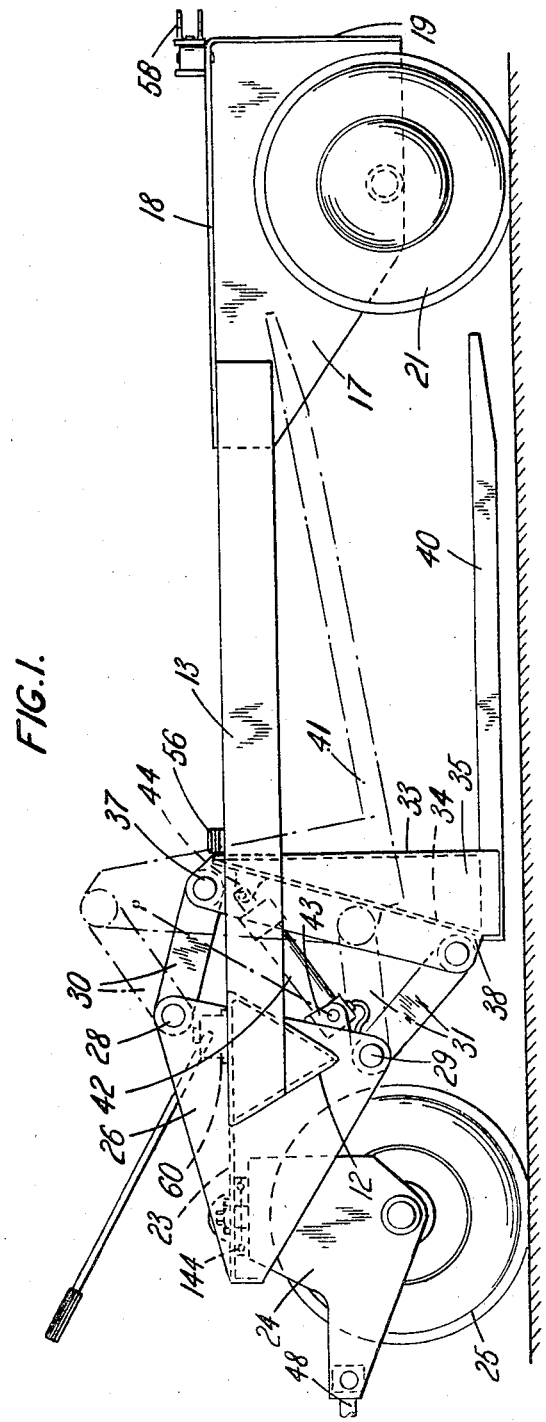
Figure 1 is a side-elevation of the truck.
Figure 2:
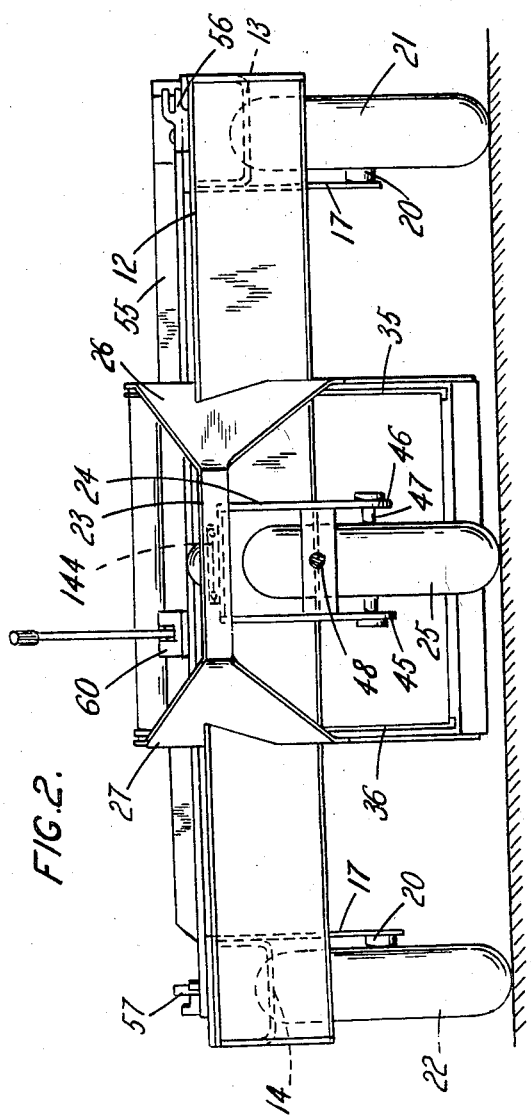
Figure 2 is an end-elevation, viewed from the left as shown in Figure 1.

A chassis 11 is provided which consists of sheet steel portions bent to shape and welded together. One end of the chassis, which will be referred to as the head-end, consists of a strong triangular tube 12 extending across the chassis from side to side with one side horizontal and the other two sides forming a trough below it. The ends of the tube are notched out to receive the ends of two horizontal rectangular tubular side members 13, 14 of the chassis which are welded into the ends of the triangular tube 12, so as to be flush with the top and extend parallel with one another forwardly from it. The triangular section of the head of the chassis makes a very rigid construction capable of withstanding large twisting forces without deformation, and the tubular side members are capable of carrying substantial bending moments. At the rear ends of the tubular side members, there are welded on sheet metal brackets 15, 16 each comprising a deep vertical web 17, and top and end flanges 18, 19 to stiffen the web. Stub axles 20 are welded to the web 17 and carry pneumatic tire road wheels 21, 22 which are partly enclosed by the top and end flanges 18, 19.

To the center of the head-end of the chassis on top of the horizontal triangular tube 12, there is welded a plate 23, which extends from it in the opposite direction to the tubular sides of the chassis and overlies a turntable 24 for a third road wheel 25. The plate 23 constitutes a platform to the underside of which the turntable 24 is secured. It is strengthened by two vertical side plates 26, 27, which are welded to it and which project from it both upwardly and downwardly along each side edge. The side plates 26, 27, extend across the triangular tube above and below and are welded to the tube 12, so that the platform is held rigid with the tube. The side plates taper in width, being narrow at the outer end of the platform 23, and broadest at the inner edge of the tube. Here each plate affords two anchoring points 28, 29 for links 30, 31, one link above the other. From each plate the two links 30, 31 extend rearwardly and each pair of links is pivoted to a movable fork-carrying frame 32 which lies between the side members of the chassis.

The fork-carrying frame 32 is constructed of stout sheet metal and consists of a head which extends parallel and within the head-end of the chassis and consists of two upstanding plates 33, 34 which are united to one another along their top edge and spaced at the bottom. End-plates 35, 36 are welded to these plates which serve to hold them in their correct angular position; the end-plates extend forwardly from the head sufficiently to provide ears 37, 38 to which the links 30, 31 are secured. Let into the bottom of the inverted V-shaped head, are two box section steel flat fork arms 40, 41, which are spaced apart from one another by about the same distance as the fork arms of a fork-lift truck. The relative proportions of the links which connect this fork arm assembly to the interior of the head-end of the chassis are such that if the fork arms are close to the floor they are parallel with the floor, but the fork arms can be lifted, and if lifted they tilt a little as they rise as shown in chain lines, Figure 1, so that their tips become higher than the level of their place of attachment to the head.

The lifting is accomplished by a jack 42 which extends between ears 43, 44 welded respectively to the center of the bottom of the triangular head-end 12 of the chassis and to the center of the top of the head member 32 of the fork. If the jack 42 is extended the fork is lifted.

The turntable 24 for the single front wheel of the truck, comprises a ball bearing 144 beneath the platform, below which is a frame comprising two downwardly extending forks 45, 46, between which the front wheel axle 47 extends. The turntable frame also carries a tow-bar 48 with an eye 49 at the front end for attachment to a towing vehicle. The tow-bar is pivoted for up and down movement and provided with a handle 50.

The two sides 13, 14 of the chassis are spaced apart widely enough to permit them to be run, by wheeling the chassis backwards, one on each side of a pallet of the dimensions with which the truck is intended to deal. In use the jack is lowered so that the forks are just clear of the ground, and the truck is run backwards with its sides on each side of the package, so that the fork arms 40, 41 enter beneath the pallet or stillage on which the package rests. The jack 42 is then operated to lift the fork arms and package, and in so doing the arms are tilted so that the package leans forward against the deep vertical front face 33 of the head which carries the fork arms. This ensures that the package will not tend to slide off. Thereupon, if it is thought desirable, it can be lashed in place, although for many purposes this is unnecessary. The truck thus loaded can be run to any desired position, either by hand or by a towing vehicle, and will deposit its load by merely lowering the jack. This permits goods to be quickly and easily transported from one works to another, or across an airfield or otherwise, as desired, without recourse to lorry transport and without waste of lift trucks, which are much more complicated and expensive.

Preferably a tie-bar 55 consisting of a length of angle-iron, is hinged by a universal joint at 155 to the rear end of one of the side arms 13 of the truck. This tie-bar normally extends along the side arm 13, to which it can be secured by a fixing-bracket 56. However, if several trucks are in use, the tie-bars can be swung across the open ends of the sides of the chassis as shown in Figure 3, and secured by a steel pin 57 (which is also used to hold it to the bracket 56) to the other side arm of each truck. In the centers of the tie-bars are fittings 58 to receive a tow-bar, and by this means a series of trucks can be joined together and form a train of trucks. The universal joint at 155 permits the tie-bar to be rotated vertically from the stowed position to save swinging it horizontally in confined spaces.

I claim:

1. A towable truck comprising in combination a tubular frame consisting of a head member and two rearwardly extending side arms, a tie bar having tow bar coupling means mounted thereon, universal joint means removably connecting said tie bar to the rear end of one of said side arms so that said bar extends across the rear ends of said side arms such that said frame and said bar enclose a load carrying space, a wheel associated with each of said side arms at the rear ends thereof, a wheeled steerable bogie extending forwardly of said head member and having a tow bar associated therewith, means mounted on said head member to support load carrying means within said space, and bracket means attached to one of said side arms, said bracket means being adapted to secure said tie-bar in fixed relation to said side arm when not in use.

2. A towable truck comprising in combination a tubular frame consisting of a head member and two rearwardly extending side arms, a tie-bar having tow bar coupling means mounted thereon, means removably connecting said tie-bar across the rear ends of said side arms such that said frame and said bar enclose a load carrying space with said tie-bar being removable for free access to said space rearwardly between said side arms, said means removably connecting said tie-bar including pivotal connection means between one end of said bar and the rear end of one of said side arms, said pivotal connection means comprising universal joint means and releasable connection means between the other end of said bar and the rear end of the other of said side arms whereby upon release of said releasable connection means at said other end of said bar, said bar may be swung about said universal joint means as a pivot into alinement with said one side arm for free access to said space rearwardly between said side arms, a wheel associated with each of said side arms at the rear ends thereof, a wheeled steerable bogey extending forwardly of said head member and having a tow bar associated therewith, and means mounted on said head member to support load carrying means within said space.

3. The towable truck of claim 2, further including bracket means attached to said one side arm for securing said tie bar in alinement with said one side arm.

References Cited in the file of this patent

UNITED STATES PATENTS

| | | |
|---|---|---|
| 1,193,551 | Howard | Aug. 8, 1916 |
| 1,230,839 | Beagle | June 26, 1917 |
| 1,402,480 | Childress | Jan. 3, 1922 |
| 1,437,212 | Allen et al. | Nov. 28, 1922 |
| 1,601,917 | Kinvall | Oct. 5, 1926 |
| 1,847,382 | Collins | Mar. 1, 1932 |
| 1,849,028 | Robinson | Mar. 8, 1932 |
| 1,870,906 | Gottschalk et al. | Aug. 9, 1932 |
| 2,052,697 | Cochran | Sept. 1, 1936 |
| 2,110,424 | Quayle | Mar. 8, 1938 |
| 2,382,054 | Hercik | Aug. 14, 1945 |
| 2,397,530 | Brosius | Apr. 2, 1946 |
| 2,583,216 | Hoffman | Jan. 22, 1952 |
| 2,616,580 | Olson | Nov. 4, 1952 |
| 2,657,938 | Browne et al. | Nov. 3, 1953 |

FOREIGN PATENTS

| | | |
|---|---|---|
| 242,736 | Great Britain | Nov. 19, 1925 |